March 29, 1949.

O. J. MUELLER ET AL 2,465,390

APPARATUS FOR CUTTING WIRES AND
WELDING THEM TO ELEMENTS

Filed Sept. 24, 1945

INVENTORS.
Otto J. Mueller
BY Albert L. Babcock

ATTORNEY

Patented Mar. 29, 1949

2,465,390

UNITED STATES PATENT OFFICE 2,465,390

APPARATUS FOR CUTTING WIRES AND WELDING THEM TO ELEMENTS

Otto J. Mueller, Rutherford, and Albert L. Babcock, Newark, N. J., assignors to Federal Telephone and Radio Corporation, New York, N. Y., a corporation of Delaware Application September 24, 1945, Serial No. 618,336

3 Claims. (Cl. 140—112)

1

The present invention relates to an apparatus for and a method of cutting wires and welding them to elements, and in particular to rectifier elements.

The welding of wire pieces to small devices, such as 1 mm. rectifiers is a difficult and time-consuming operation particularly in view of the small size of the rectifiers to be treated.

It is, therefore, the main object of the present invention to devise an apparatus which automatically and continuously welds a piece of wire to each terminal of a rectifier element and after cutting a certain predetermined length of the wire moves the rectifier ahead on a conveyor from a first welding station where a piece of wire has been welded to one terminal of the rectifier element to a second welding station where another piece of wire is welded to the other terminal of the rectifier element, and then the other piece of wire is cut at a certain predetermined length, whereupon the rectifier now equipped with two wires is moved on.

It is a further object of the present invention to provide means for feeding the wire to the two welding stations.

It is still a further object of the present invention to provide means for cutting the wire at predetermined length.

It is another object of the invention to provide means for feeding successively a plurality of rectifiers to a first welding station from there to a second welding station and then out from the last mentioned station.

It is still another object of the present invention to provide means for moving wire to the respective welding stations into welding position and means for retaining the wire at said stations for a predetermined timely period before cutting the latter.

It is still a further object of the present invention to provide means for coordinating the wire feeding means, the welding means and the cutting means as well as the rectifier holding means in such a way that the respective operations are performed in proper succession.

It is yet another object of the present invention to provide a method of feeding wire to welding stations, feeding elements in succession to the respective welding stations, holding the wire and the elements in position during the respective welding operations, and cutting the respective wires upon completion of the welding operations.

It is still another object of the present invention to provide a method for operating the wire feeding means to the respective welding stations,

2 the wire cutting means, and the wire welding means in proper timely coordination.

With these and other objects in view the present invention will become apparent and will be clearly understood from the following detailed description in connection with the accompanying drawings in which:

Fig. 14 shows an elevational view of a rectifier element with the wires welded on both sides in enlarged scale for purpose of better demonstration.

Referring now to the drawings, the apparatus consists of a table-like frame 1 which is equipped with a lower supporting plate 2 and an upper supporting plate 3.

The lower supporting plate 2 is adapted to support the motor 4 which drives all operating devices through a speed reducer 5. As clearly shown in Figs. 3 and 4, the motor 4 is connected by a belt 6 with a main driving shaft 7 which over proper transmissions as belt drives 8 drives two operating shafts 9, as well as one wheel of an endless conveyor as described later.

The operating shafts 9 are mounted in bearings 10 supported by the top plate 3 of the frame 1 in parallel and somewhat spaced position at opposite sides of the mentioned conveyor. Each one of the shafts 9 carries a driving wheel 11, a cam 12 for operation of the wire feeding device, a cam 13 for operation of the wire cutting device, a cam 14 for operation of the rectifier holding device and a disc 15 for operation of the welding device.

Figure 4:
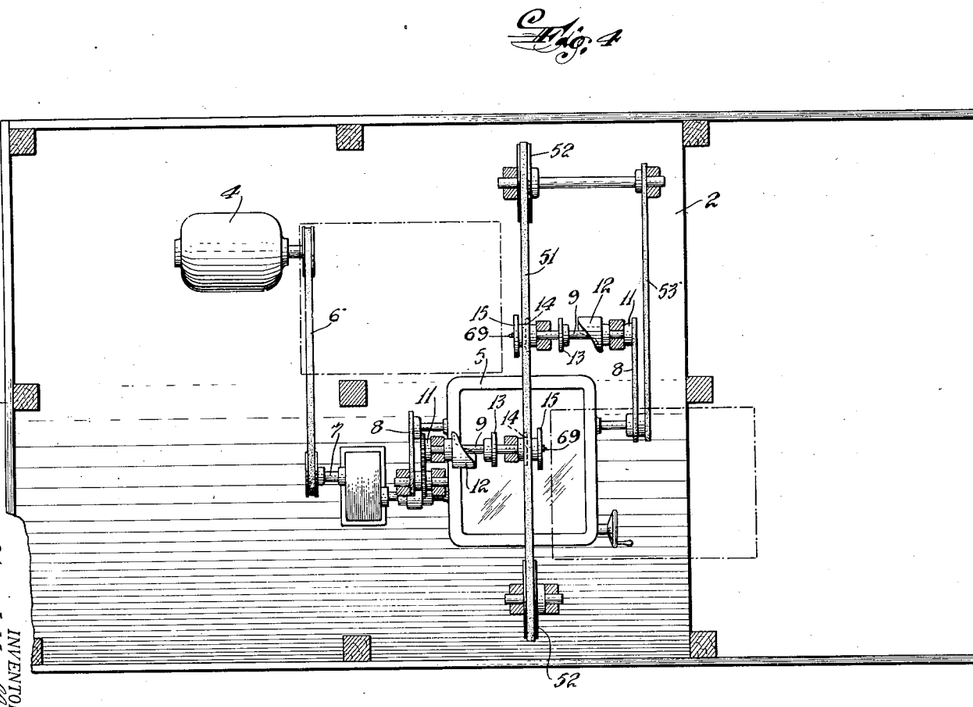
Fig. 4 is a plan view, the top plate of the supporting frame and all elements supported by it being removed for the purpose of better demonstration.
Figures 4, 5:
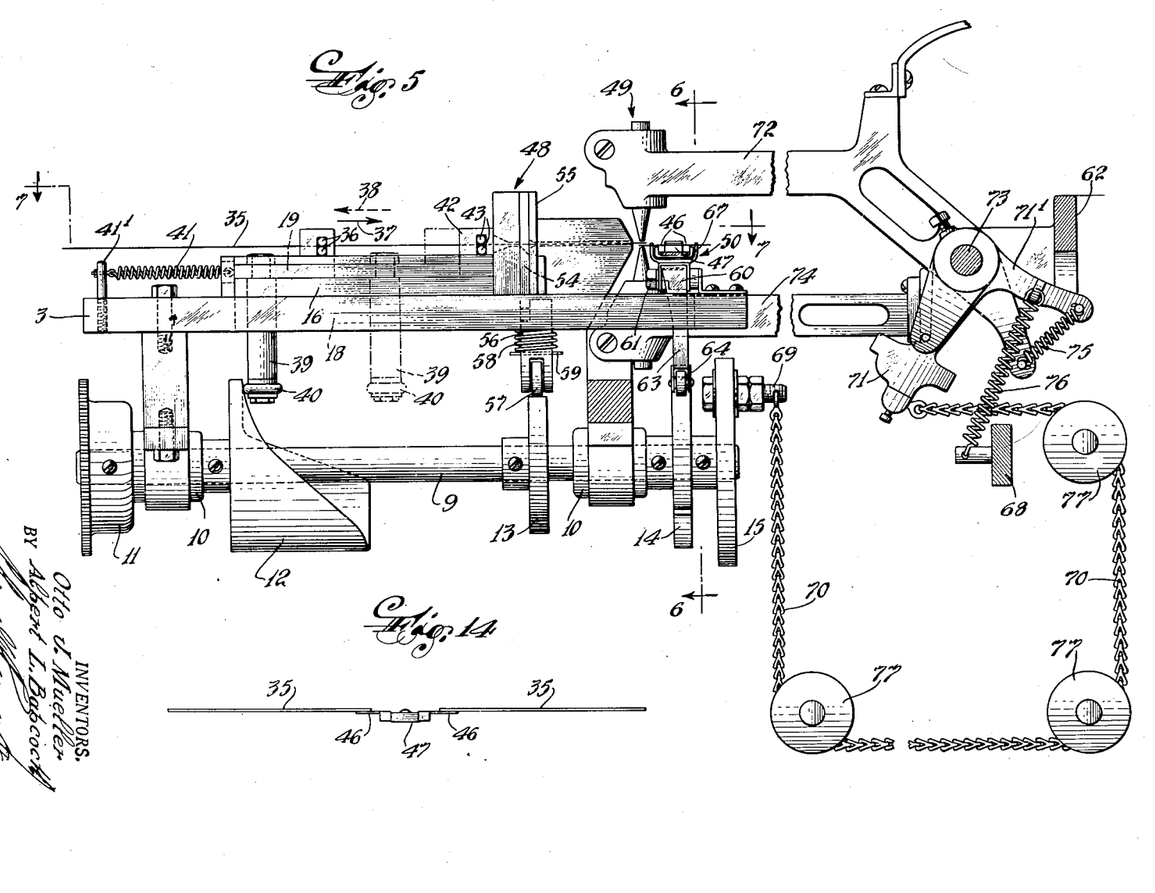
Fig. 5 shows in enlarged scale an elevational front view of the operating mechanism of the apparatus.

The wire feeding device is clearly disclosed in Figs. 5, 7, 8 and 9. Two guides 16 are mounted preferably by screws 17 on top of the upper plate 3 which is equipped with a longitudinal slot 18 extending parallel to the guides 16. A sliding base 19 is adapted to reciprocate between the guides 16 in a direction parallel to the shaft 9. One end of the base 19 is of preferably rectangular cross-section whereas its other end is equipped with upwardly extending arm portions 20 thus forming a substantially U-cross-section. The arm portions 20 are wider near the base 19 and stepped to narrower upward extensions. As shown particularly in Figs. 8 and 9, the steps in the arm portions 20 provide an inclined face 21 which extends upwards from the rear face of the arm portions 20 to their forward face. Each one of the arm portions 20 is provided with a crosswise extending threaded boring 22 near their top, which borings 22 are adapted to receive studs 23. The sliding base 19 is also equipped with a recess 24 which is adapted to receive a coil spring 25. A threaded boring 26 extending vertically through the base plate 19 near its rear end is also provided and adapted to receive a set screw 27. Both the recess 24 and the threaded boring 26 are preferably arranged along the longitudinal center line of the sliding base 19 between the arm portions 20. The wire feeding device comprises a member 28 in the shape of an inverted U, to be inserted between the arm portions 20 of the sliding base 19 between two bushings 29. The top of the member 28 is provided with a transverse boring 30 which receives the studs 23 thereby serving as pivot around which the member 28 can turn. The front leg portion 31 of the member 28 is provided with a circular boring 32 of substantially larger diameter than the diameter of the wire, and the rear leg portion 33 of the member 28 is provided with a cylindrical boring 34 of a diameter closely approximating the diameter of the wire 35 to be pulled. Two rollers 36 are inserted in superposed position in the space between the legs 31 and 33. The rollers 36 are of greater length than the width of the member 28 (Fig. 9) and nearly abut the arm portions 20. The lower roller 36 rests on the inclined face 21 of the stepped arms 20, whereas the upper roller 36 rests on the lower roller. The lower end of the leg portion 31 of the member 28 has a vertically extending recess 37 adapted to receive the upper end of the coil spring 25, the lower end of which is inserted in the recess 24 of the sliding base 19. By this arrangement the spring 25 will tend to turn the body around the pivot 23, which turning movement can be adjustably limited by means of the set screw 27 inserted in the threaded boring 26 of the sliding base 19. The rollers 36 are adapted to receive the wire 35 between them and upon moving the sliding base 19 in the direction of the arrow 37, shown in full lines, the lower roller 36 will roll upwards on the inclined face 21 and thereby be pressed against the wire 35 and the upper roller 36. The wire 35 clamped between the two rollers 36 is moved for the same length as the sliding base 19 travels. Upon return of the sliding base 19 to its original position in the direction of the arrow 38, shown in dotted lines, the lower roller 36 is again moved on the inclined face 21, however, this time downwardly, thereby releasing the pressure against the wire 35 and the upper roller 36. Thus the sliding base 19 together with the member 28 will move backwards along the wire 35 without any friction, which wire 35 will remain and be retained in its position by a second clamping device to be described later. In order to assure a reciprocating movement of the sliding base 19, the latter carries at its front end a bolt 39 the lower end of which is equipped with a follower roller 40 to be operated by the cam 12 which is keyed on the shaft 9. As shown in Fig. 5, the bolt 39 moves upon turning the shaft 9 and thereby of the cam 12 from a rear position (shown in solid lines) to an extreme front position (shown in dotted lines), whereas the return to its original position is achieved by a spring 41 one end of which is connected to the front end of the sliding base 19, whereas its other end is connected with a suitable mounting 41' attached to the top plate 3 of the frame 1.

The above mentioned second clamping device 42, which is constructed preferably identically with the clamping device on the sliding base 19, is secured to the guides 16 and therefore remains stationary. The wire 35 advanced by the clamping device mounted on the sliding base 19 will be moved through the clamping device 42 and in particular between its rollers 43 without any friction since the lower roller 43 of the device 42 rests again on an inclined face rising again from the rear to the front face of the arms of the device 42. However, a tendency to withdraw the wire from the advanced position during the return movement of the sliding base 19 will be avoided, since a withdrawal of the wire would immediately be blocked by the clamping action of the lower roller 43 of the device 42.

In order to provide a continuous feed of wire, two drums 44 are rotatably secured on the top plate 3 of the frame 1, one for each welding station. A number, preferably four rollers 45 are provided between the drums 44 and the clamping and feeding device for the wire 35 in order to straighten out the wire 35 before it enters the member 28.

Whereas the feeding device above described has the task of feeding a certain length of wire into a predetermined position just above the terminals 46 of the rectifier element 47, the wire cutting device 48 is effective to cut the front end of a portion of the wire 35, the rear end of which is to be welded by means of the welding device 49 to the terminal 46 of the rectifier 47.

It has been disclosed above that the wire feeding device is operated by the cam 12, whereas the cutting device 48, a holding device 50, and the welding device 49 are operated by the respective cams 13, 14 and disc 15, as will be described later. The rectifier elements 47 are fed to the first welding station, where upon stopping of their movement one wire is welded on, from there to the second welding station where again upon stopping their movement the second wire is welded on and finally to a receiving chute (not shown) by an endless conveyor 51 which runs over wheels 52, one of which is driven by a belt drive 53 from the speed reducer 5. Each one of the two welding stations is equipped with a wire feeding device, a wire cutting and a welding device as well as a holding device for the rectifier element, the two sets of mentioned devices being arranged for each station on opposite sides of the endless conveyor 51.

It has been stated before that the wire cutting device 48 is operated by the cam 13 keyed on the shaft 9. This device includes a knife 54 (Figs. 5 and 7) mounted between side, front and rear guide plates 55 in such a way that it performs a vertical reciprocating movement by inserting it into a holder 56, the end of which is equipped with a follower roller 57 pressed against the cam 13 by a spring 58 one end of which is supported by a crosswise extending pin 59 whereas its other end abuts against the lower face of the top plate 3 of the frame 1. When the follower roller 57 is raised to the upper dwell of the cam 13 the knife 54 is raised correspondingly and the spring 58 returns the knife 54 to its previous lower position when the follower roller 57 reaches again the lower dwell of the cam 13.

Figure 1:
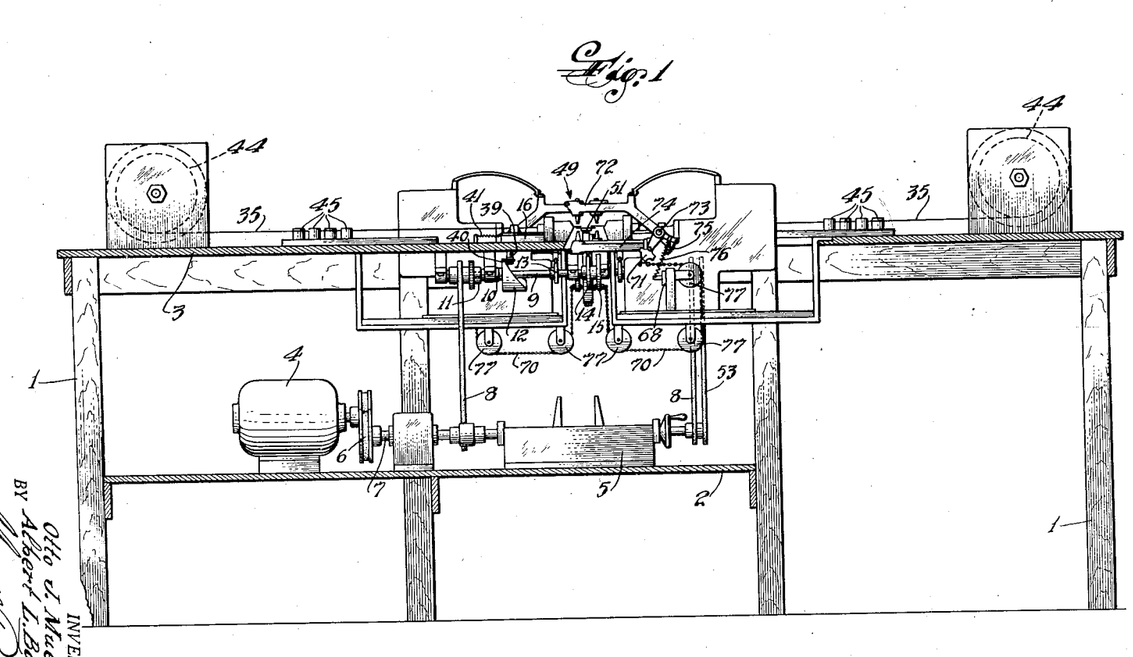
Figure 1 is an elevational front view of the apparatus for cutting and welding wire on rectifier elements.
Figure 2:
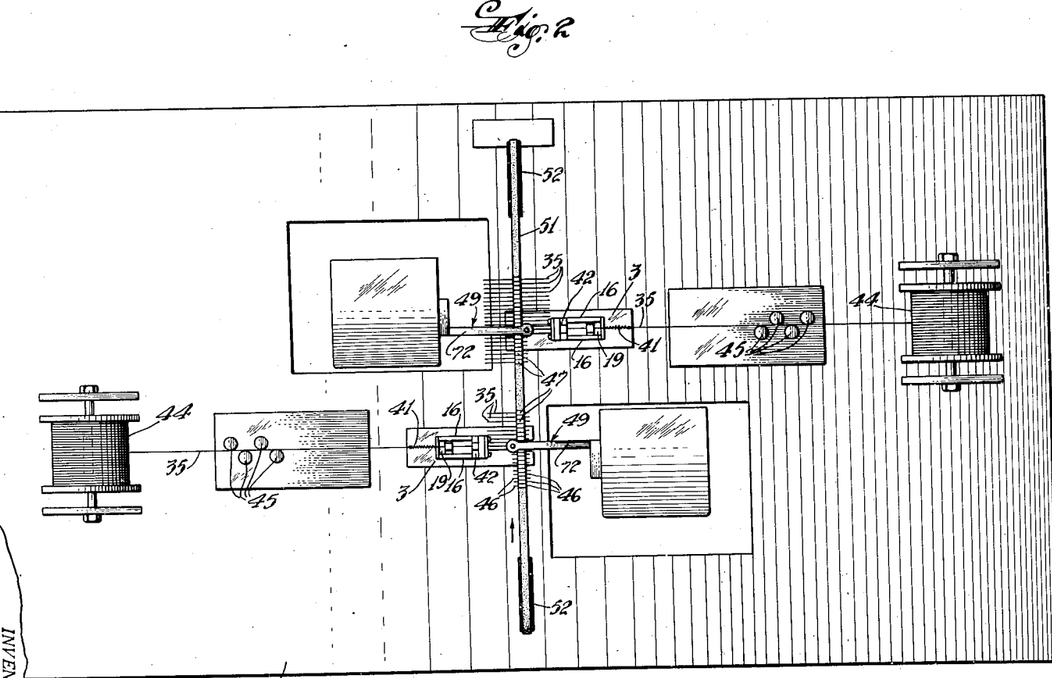
Fig. 2 is a plan view of the apparatus as shown in Fig. 1.
Figures 3, 6, 13:
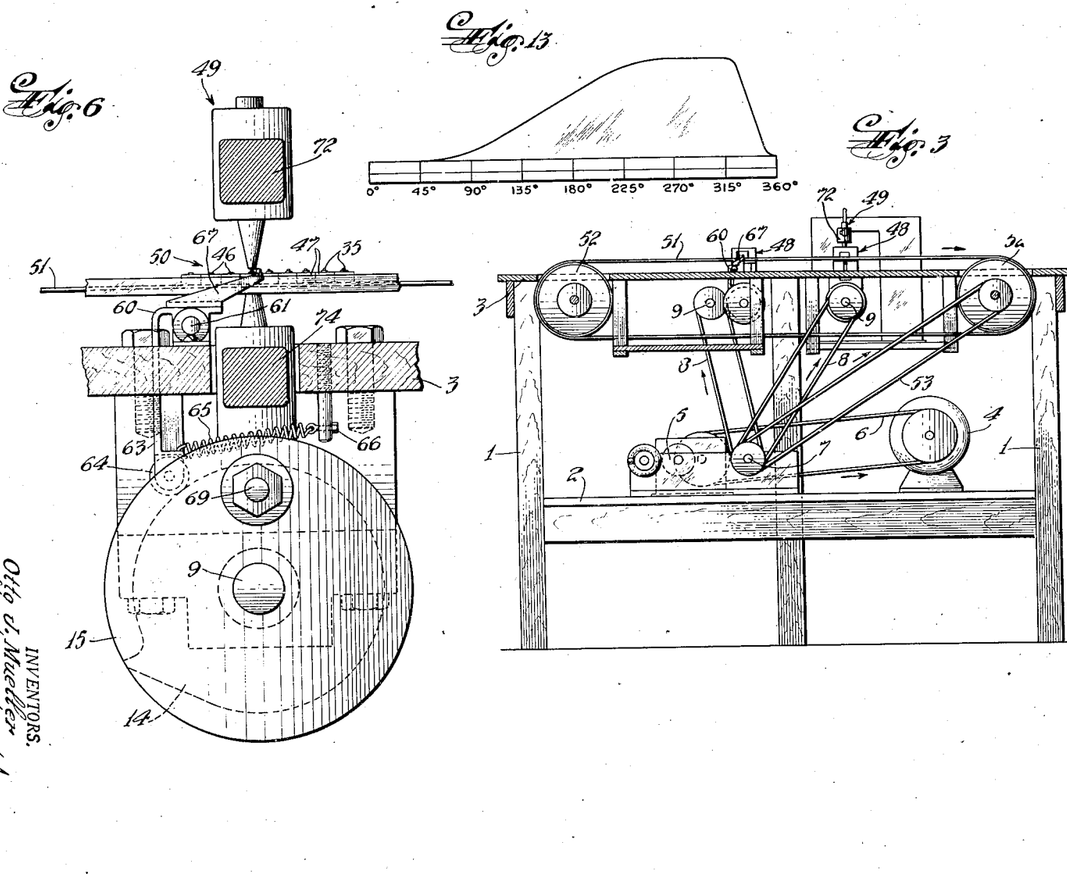
Fig. 3 is an elevational side view of the apparatus.
Fig. 6 is a sectional view in accordance with the lines 6—6 of Fig. 5.
Fig. 13 shows a diagram of the shape of the cam operating the wire feeding device.

The holding device 50 for the rectifier element 47 is illustrated in Figs. 5 and 6 of the drawings. This device comprises essentially a double-armed lever 60 which is pivoted on the stud 61 supported in a bracket attached to top plate 3. The downward extending arm 63 of the lever 60 carries at the lower end a follower roller 64 which by means of a spring 65 is pressed against the cam 14. One end of the spring 65 is attached to the arm 63 of the lever 60 whereas the other end of the spring 65 is connected to a bolt 66 mounted on top plate 3 of frame 1. The upwards extending arm 67 of the lever 60 is bifurcated and adapted to catch the terminals 46 extending sidewards from the rectifier element 47 and thereby retaining the rectifier element 47 in a position abutting against the branches of the arm 67 despite continuous movement of the conveyor 51. The arm 67 is so positioned that the branches hold one of the terminals being exactly between the poles of the welding device 49. When the follower roller 64 reaches the upper dwell of the cam 14, the downwards extending arm 63 of the lever 60 will be turned around the pivot 61 in the direction of the arrow shown in Fig. 6, thereby lowering the upwardly extending arm 67 below the path of the rectifier element 47. The rectifier element 47 one of the terminals 46 of which just received a piece of wire 35 will move forward with the conveyor 51, and since the roller 64 returns to the lower dwell within a very short period, the arm 67 of the lever 60 is raised again before the next rectifier element 47 carried by the conveyor 51 reaches the welding station. Thus the next rectifier element 47 is caught again and held in position during the welding operation for the entire cycle until it is released by the follower rollers 64 reaching again the high dwell of the cam 14. This operation takes place in both welding stations in the same manner and at the same time.

As discussed before, the welding device 49 is operated by the disc 15 which carries an extension shown as a bolt 69. One end of a chain 70 is attached to the bolt 69 and its other end to an extension 71 of a double-armed lever 71' rotatable about a pivot 73 supported by an auxiliary frame 62. The welding device consists mainly of two electrode holders, one in the form of a pivoted arm 72 and the other in the form of a stationary arm 74. Any kind of welding device can be used in connection with the present apparatus and the device shown in the drawings is merely given by example. The known device illustrated is formed with the free ends of the lever 71' and the arm 72 being connected by a spring 75, in order to meet any unexpected resistance against lowering of the welding arm 72. Another spring 76 one end of which is attached to the rear end of the arm 72 and the other end of which is attached to another auxiliary frame 68 tends to keep the arm 72 in the lifted inoperative position. The chain 70 runs over preferably three rollers 77 and once in every cycle upon rotating of the shaft 9 the welding arm 72 is lowered into welding operative position. Upon further turning of the shaft 9 the spring 76 returns the arm 72 to its lifted inoperative position.

The cams 12, 13, 14, and disc 15 are keyed on the shaft 9 in such relative position that the operations to be performed are in proper timely succession. As shown in Fig. 5 the follower roller 40 of the bolt 39 mounted in the sliding base 19 remains on the lower dwell of the cam 12 for a period of about 45°. The feeding movement of the wire extends over a period from 45° to 270° by comparatively slow rising of the dwell of the cam 13. Over a period from 270° to 315°, that is again over a period of 45°, the wire feeder remains in the advanced position whereupon the return movement of the bolt 39 takes place over a comparatively short period from 315° to 360°, that is within 45°. Thus it can be seen that the pulling period extends over 225° whereas the end return movement extends only over 45°.

Figures 7, 8, 9, 10, 11, 12:
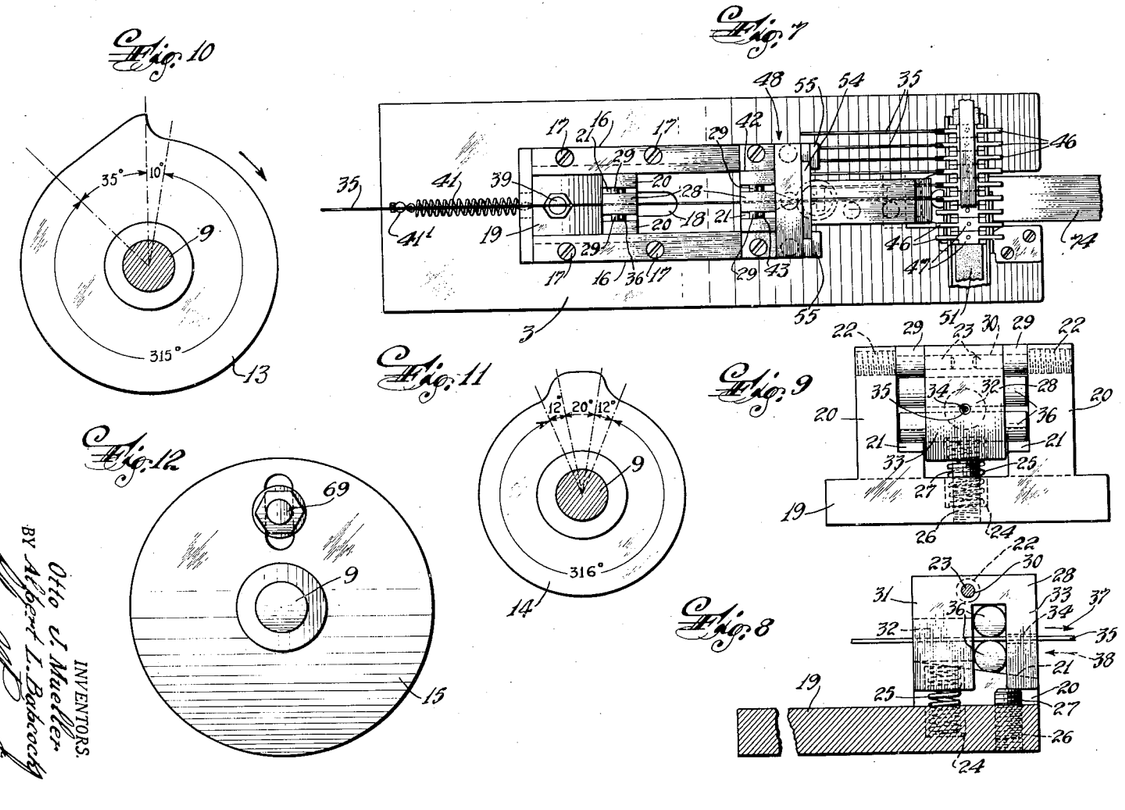
Fig. 7 is a sectional view in accordance with the lines 7—7 of Fig. 5.
Fig. 8 shows in enlarged scale a front elevation of the wire feeding means.
Fig. 9 shows a side elevational view of the wire feeding means as shown in Fig. 8.
Fig. 10 shows the cam operating the wire cutting device.
Fig. 11 shows the cam operating the rectifier holding device.
Fig. 12 shows the cam operating the welding device.

As shown in Fig. 10, the cam 13 which operates the knife 54 shows a rise from the lower dwell to the upper dwell over a period of only 10° which represents the cutting period of the wire 35. Upon reaching the high dwell the knife is immediately lowered over a period of 35°. The follower roller 57 operating this cam 13 remains on the lower dwell for the rest of the cycle, namely for 315°, whereupon again the cutting period of the next piece of wire begins, which wire has been moved ahead in the meantime.

The cam 14 as shown in Fig. 11 operates the holding device 50 for the rectifier elements 47. Since the rectifier elements are arranged on the conveyor 51 in short spaced position, it is necessary to lift and lower the arm 67 of the lever 60 comparatively fast. Consequently the follower roller 64 rises from the lower dwell of the cam 14 to its upper dwell for a period of only 12° at the end of which period the bifurcated arm 67 is lowered out of the path of the rectifier element 47. The follower roller remains then on the upper dwell for a period of 20° in order to give just time to move the next rectifier element into welding position whereupon the arm 67 is very fast lifted again, namely for a period of 12°. For the remaining period, namely for 316° the follower roller 64 remains on the lower dwell of the cam 14 which corresponds with the raised position of the arm 67 during which the rectifier element is held in welding position.

The disc 15, as shown in Fig. 12 and already stated before, is equipped with a bolt 69 on which one end of the chain 70 is attached. By turning the shaft 9 and thereby the disc 15 the arm 72 of the welding device 49 will perform a reciprocating turning movement. It will remain in the lower position for just a short time interval during which the welding circuit is closed by known means (not shown) and the welding of the end of the wire 35 to the terminal 46 of the rectifier element 47 takes place. The spring 76 assures the returning lifting movement of the welding arm 72 during the corresponding position of the disc 15.

The apparatus, as described above, for cutting and welding of wire operates in the following manner:

As stated above the apparatus comprises mainly a wire feeding device, a wire cutting device, a rectifier feeding device and a welding device. Each one of the devices performs one operation within the cycle of 360°. The succession of the operations is the following: First, when the rectifier element is kept in position by means of the holding device and the wire is also held in position by means of the stationary clamping device, the welding takes place by operating the welding device by means of the disc 15. The cam 13 is keyed to the shaft 9 in such a way that immediately upon completing the welding step the follower roller 57 is raised up to the upper dwell for a period of 10° (Fig. 10) thereby performing the cutting of the wire. Upon completing the cutting step the knife 54 is lowered again over a period of 35°. After completing the last mentioned 45° of the cycle two devices start operating at the same time, namely the holding device for the rectifier element and the wire feeding device. The holding device for the rectifier element is operated by the cam 14 and is keyed on the shaft 9 in such a way that the follower roller 64 starts rising for a period of 12° from the lower to the upper dwell of the cam 14, remains on the upper dwell for 20° and then falls again to the lower dwell for a period of 12° (Fig. 11). During a period of 20° in which the follower roller 64 is on the upper dwell of the cam 14 the holding device is lowered and allows the passing of the rectifier element with the conveyor 51 which element has been subjected to the welding process and at the same time the next rectifier element positioned on the conveyor 51 is brought into welding position. Before this rectifier element passes the welding station the holding device is lowered again due to the short period of the upper dwell of the cam 14 and thereby retains this rectifier element in position. This rectifier element is held in position for the remainder of the cycle until at the beginning of the next cycle a wire which has been fed to this rectifier element in the meantime is welded to one terminal of this rectifier element.

Timely parallel with the operation just described in connection with the holding device the wire feeding device performs its operation. At the end of the 45° period described above in connection with the holding device the wire feeding device performs its operation. At the end of the 45° period described above in connection with the cutting device the cam 12 is in such a position in the shaft 9 that the follower roller 49 is located on the lower dwell of the cam 12. For a period of 225° the follower roller will rise to the upper dwell of cam 12 thereby pulling the wire for a predetermined length against the rectifier element and when the upper level is reached, the wire will remain in the most forward position, namely the end of the wire partly covering the terminal of the rectifier element, as shown in Fig. 5. After a further period of 45° the last movement of the feeding device will start by lowering the follower roller again from the upper dwell to the lower dwell, which return movement is completed in a period of 45°. During the return movement the feeding device glides over the wire back to the original position. The wire itself is held against return movement by the clamping device 42. The different devices remain in the respective positions to the end of the cycle and at the beginning of the next cycle the welding device starts again the first of the operations.

The just described succession of operations of welding and cutting of wire takes place at each one of the two welding stations at the same time and as particularly Fig. 3 demonstrates one power source drives both shafts 9 as well as one wheel of the conveyor 51 carrying the rectifier elements.

While we have disclosed the principles of our invention in connection with a single embodiment, it will be understood that this embodiment is given by way of example only and not as limiting the scope of the invention as set forth in the objects and the appended claims.

What we claim is:

1. In an apparatus for cutting and welding of wire to a rectifier element having two oppositely extending terminals, an endless conveyor carrying a plurality of said rectifier elements, two welding stations arranged along said conveyor, each one of said welding stations comprising a wire feeding device, a wire cutting device, a rectifier holding device and a welding device, said wire feeding device consisting of a reciprocating clamping member and a stationary clamping member, said reciprocating clamping member blocking the wire during movement in the feeding direction, said stationary clamping member blocking the said wire during the return movement of the said reciprocating clamping member, said cutting member consisting of a knife adapted to perform a reciprocating movement in a plane about 90° to the feeding movement of the wire, said holding device consisting of a reciprocating lever arm, bifurcated ends on said arm adapted to extend into the path of the terminals of said rectifier element, cams operating the said wire feeding device, the said wire cutting device, the said rectifier holding device and the said welding device, said devices being operated by said cams in predetermined timely succession.

2. Clamping means for feeding of wire comprising a sliding base, means for reciprocating said sliding base, upwardly extending arms on said sliding base, a pivot arranged crosswise at the top of said arms, an inclined face on the inside of said arms, said face extending upwards from the rear face to the front face of said arms, a U-shaped member inserted between the said arms and supported by said pivot inserted in said arms, two rollers inserted in superposed position in the open space of said U-shaped member, said rollers adapted to receive said wire, the lower of said rollers resting on said inclined face.

3. In an apparatus for cutting and welding of portions of wire to a metal member, comprising a conveyor carrying a plurality of said metal members, at least one welding station arranged along said conveyor, said welding station including a wire feeding device, a wire cutting device, a device for holding one of said members and a welding device, said wire feeding device consisting of a reciprocating clamping member and a stationary clamping member, said cutting member including a knife arranged for movement in a plane substantially 90° with respect to the feeding movement of the wire, said holding device consisting of a reciprocating lever arm having a portion extending into the path of said metallic member, and means for operating said wire feeding device, said wire cutting device, said member holding device and said welding device in a predetermined succession.

OTTO J. MUELLER.
ALBERT L. BABCOCK.

REFERENCES CITED

The following references are of record in the file of this patent:

UNITED STATES PATENTS

| Number | Name | Date |
|---|---|---|
| 1,309,662 | Smith | July 15, 1919 |
| 1,448,566 | Muller, Jr. et al. | Mar. 13, 1923 |
| 1,495,508 | Campbell | May 27, 1924 |
| 1,655,471 | Marcell | Jan. 10, 1928 |
| 1,993,483 | Leland | Mar. 5, 1935 |
| 2,111,426 | Hilbert | Mar. 15, 1938 |